No. 656,727. Patented Aug. 28, 1900.
J. RAY.
TANK FOR WATERING POULTRY.
(Application filed May 31, 1900.)
(No Model.)
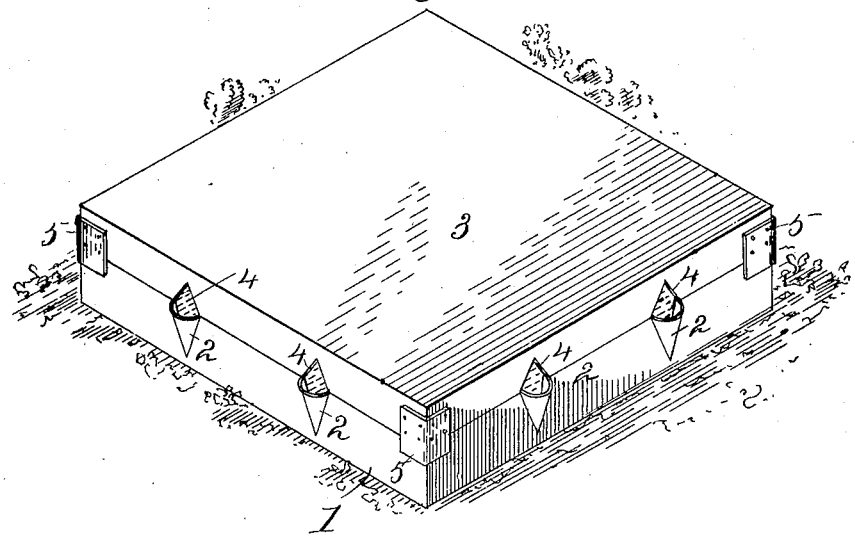
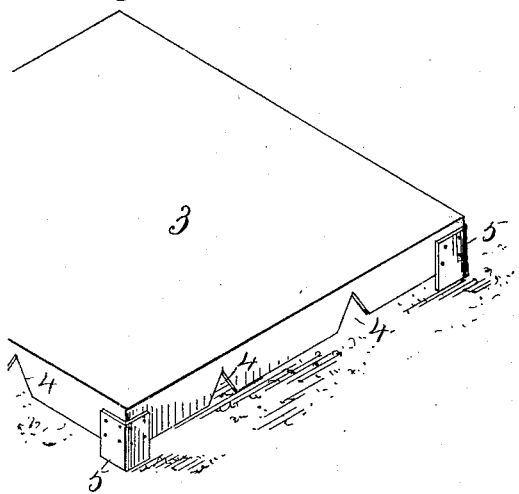
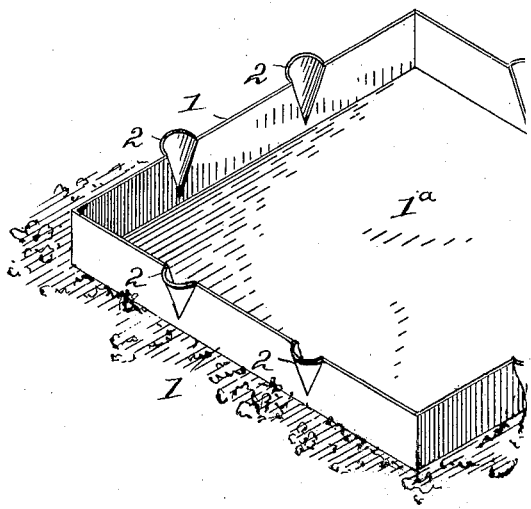
Witnesses
Nora Graham
Ina Graham
Inventor,
Joseph Ray
by L. P. Graham
his attorney

UNITED STATES PATENT OFFICE.

JOSEPH RAY, OF EMERY, ILLINOIS.

TANK FOR WATERING POULTRY.

SPECIFICATION forming part of Letters Patent No. 656,727, dated August 28, 1900.

Application filed May 31, 1900. Serial No. 18,487. (No model.)

*To all whom it may concern:*

Be it known that I, JOSEPH RAY, of Emery, Macon county, Illinois, have invented certain new and useful Improvements in Tanks for Watering Poultry, of which the following is a specification.

This invention provides simplified and improved means for maintaining a supply of drinking-water for poultry and for keeping the water clean, cool, and readily accessible for drinking purposes.

The invention is exemplified in the structure hereinafter described and it is defined in the appended claim.

In the drawings forming part of this specification, Figure 1 is a perspective representation of a tank embodying my improvements. Fig. 2 shows the tank without the cover, and Fig. 3 shows the cover detached from the tank.

The tank has a bottom 1ª and sides 1, and it is of any suitable size and configuration. It constitutes a low and comparatively-broad receptacle, and its distinguishing characteristics are that its sides are vertical, or approximately so, and that it has in its sides a number of outward-extending juts or bows 2, which are open at the top to form compartments from which the poultry may drink.
The lid 3 conforms to the tank in horizontal outline. It has vertical sides in which notches 4 are made to coincide with the juts of the tank, and it also has downward-extending corner-plates 5, which embrace the corners of the tank and hold the lid in place. The juts 2 of the tank are preferably spout-formed, as shown in the drawings, and the notches of the lid are preferably V-shaped. The lid protects the water and keeps it cool to some extent. The juts provide receptacles from which the poultry may drink, and the notches in the lid increase the size of the openings for the heads of the poultry without increasing the horizontal surface of the water exposed in the juts. The effect of the combined juts and notches is to give free access to the water for drinking purposes while reducing the exposure of the water to the greatest possible extent.

I claim—

A device for watering poultry comprising a tank and a lid or cover therefor; the sides of the tank jutting at intervals beyond the lid and the sides of the lid being notched coincident with the juts of the tank.

In testimony whereof I sign my name in the presence of two subscribing witnesses.

JOSEPH RAY.

Witnesses:
C. C. CRANDALL,
B. F. SHIPLEY.